Feb. 7, 1950     J. N. WOLFRAM     2,496,510
TUBE COUPLING
Filed June 29, 1946

INVENTOR.
John N. Wolfram
BY

Patented Feb. 7, 1950

2,496,510

UNITED STATES PATENT OFFICE 2,496,510

TUBE COUPLING

John N. Wolfram, South Euclid, Ohio, assignor to The Parker Appliance Company, Cleveland, Ohio, a corporation of Ohio Application June 29, 1946, Serial No. 680,451

5 Claims. (Cl. 285—86)

The present invention relates to couplings for tubes, and more particularly to couplings of the type in which there is provided means for gripping or clamping the tube to hold it within the coupling, and additional means for preventing vibrational strains upon the tube from reaching the point at which the tube is clamped.

There are a number of ways in which couplings may be attached to tubes, as for example, by flaring the tube and clamping the flare between coupling seats, or by contracting a deformable sleeve about the tube so as to either cut into the tube wall or contract the tube inward to form a holding shoulder thereon. It is well known that in these and other similar methods of gripping the tube, the latter becomes weakened at the point of grip and that fatigue failure induced by vibration strains upon the tube will occur more readily than if the tube had not been weakened. In order to increase the resistance of the coupling joint to fatigue failure, a second grip is sometimes provided upon the tube at a point spaced outwardly from the main gripping point. To be effective, the second grip should engage the tube firmly enough to interrupt the vibration strains to prevent them from reaching the main gripping point, but not tightly enough to excessively deform the tube. Otherwise the tube will become weakened at this point also and the purpose of the second grip will be defeated. To avoid an excessive grip by the vibration dampening means, it has been heretofore proposed that some means be employed for limiting the extent to which the tube is gripped at this second point.

However, such proposals invariably involve the holding of close dimensional tolerances on the cooperating parts in order that the vibration dampening grip will be sufficient but not excessive under the extreme tolerance conditions. It is, therefore, an object of the present invention to provide a coupling having vibration dampening means which can be effectively limited in extent without requiring excessively close manufacturing tolerances.

It is another object of this invention to provide a coupling having vibration dampening means which will be brought into effect with a minimum amount of wrench pressure and which will be limited in extent under excessive amounts of wrench pressure.

Another object of this invention is to provide a coupling having vibration dampening means which will be brought into full effect when the coupling is assembled with a minimum amount of wrench pressure, and which coupling is relatively simple and cheap to manufacture.

With the above and other objects which will hereinafter appear, the invention will be more fully understood from a detailed description thereof.

In the drawings—

Figure 1:
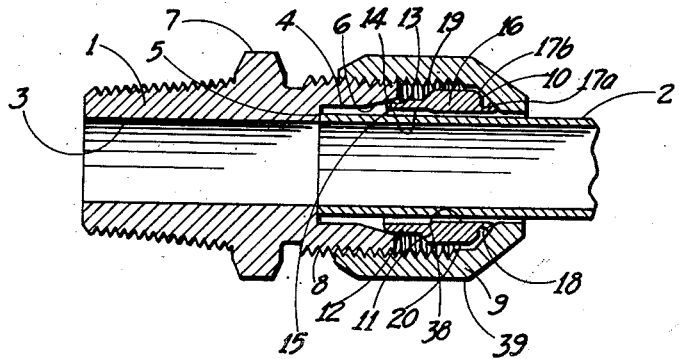
Fig. 1 is a longitudinal sectional view illustrating the invention as applied to a coupling for unflared tube and showing the coupling parts in loosely assembled position.
Figure 2:
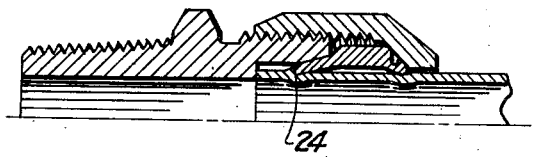
Fig. 2 is a longitudinal quarter sectional view of the same coupling illustrated in Fig. 1 except with the parts in the tightly assembled position.

The invention as embodied in a coupling for unflared tubes is illustrated in Figs. 1 and 2 and includes a body member 1 to which the tube 2 is attached. The body member has a fluid passage 3 and a counterbore 4 for receiving the tube. The counterbore 4 is preferably large enough to allow the tube to shift laterally whatever amount is necessary to overcome any eccentricity of the parts. This self-centering action assures a uniform cutting and gripping action of the sleeve upon the tube. The counterbore terminates at one end in a shoulder 5 which serves as a stop for the tube, and at its other end merges into a tapered cam surface 6. A non-circular portion 7 provides a wrench grip for assembling the coupling.

A thread 8 provides for interconnection with a nut 9 having a non-circular wrench engaging portion 39 and a frusto-conical clamping shoulder 10. In the invention as illustrated, the body member has an external thread and the nut an internal thread. It is obvious that this arrangement can be reversed, or that other means, such as bolts, can be employed for interconnecting the two parts. A sleeve 11 having a bore 38 is disposed within the nut and loosely surrounds the tube. The inward end of the sleeve has a cylindrical outer surface 12 merging into the end face by means of a rounded edge 13 and is provided with a counterbore 14 defining a sharp leading edge 15.

The outward end of the sleeve has an enlarged head 10 terminating in a tapered thrust shoulder which is divided into radially inner and outer sections 17a and 17b, respectively, by an annular groove 18. The construction and functioning of this outward end of the sleeve will be hereinafter more fully described. A tapered shoulder 19 leads from the cylindrical surface 12 to the outer cylindrical surface 20 of the enlarged head. The cylindrical surface 12 is of such diameter relative to the tapered cam surface 6 that it will initially just enter therein.

Figure 4:
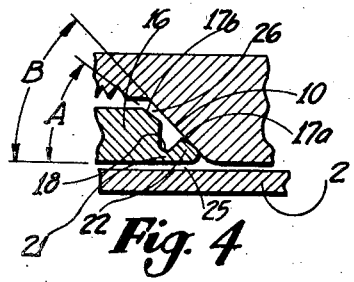
Fig. 4 is a fragmentary enlarged sectional view illustrating the vibration dampening means in the loosely assembled condition.

As is more clearly illustrated in Fig. 4, the sleeve surfaces 17a and 17b are on the same line as well as at the same acute angle A with the coupling axis. Thus the one surface portion may be considered an extension of the other. The angle B of the opposed clamping shoulder 10 is less acute than angle A whereby the clamping shoulder 10 will initially contact surface 17a and be spaced a slight distance from 17b. The annular groove 18 and the resulting thin section 21 serve to weaken the extreme portion 22 of the sleeve head and make it readily contractible under pressure from the clamping shoulder 10. The main sleeve head portion 16, being enlarged, is relatively rigid and non-contractible.

When the nut 9 is threaded upon the body member, the clamping shoulder 10 engages surface 17a and moves the sleeve forward along the tube until the rounded edge 13 contacts the body cam surface 6. Upon further threading of the nut onto the body, the front end of the sleeve becomes radially contracted and the sharp edge 15 is caused to cut into the tube as at 24 for sealing the joint and for holding the tube within the coupling. As shown in Fig. 1, the rounded edge 13 makes an initial tangential line contact with the tapered body bore 6. The counterbore 14 allows the front end of the sleeve to assume the angle of the tapered cam surface 6 and establish an area of contact therewith before the cutting edge 15 contacts the tube. When the cutting edge contacts the tube, considerable radial pressure must be exerted against the sleeve by the cam surface 6 to force the edge 15 into the tube. By having an area of contact between sleeve and body, the tendency for the sleeve to embed itself into the body is greatly minimized.

Figure 5:
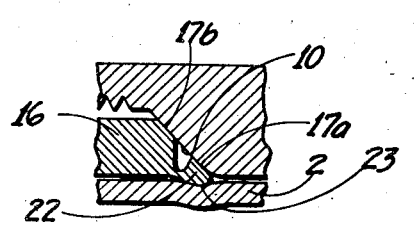
Fig. 5 is a fragmentary enlarged sectional view of the vibration dampening means in the tightly assembled position.

As the nut is threaded forward, the pressure of the clamping shoulder 10 readily contracts the weakened sleeve portion 22 and causes it to lightly engage the tube as at 23 for interrupting vibration strains and prevent them from reaching the region of the sealing and holding grip 24. After the portion 22 has contracted a fixed amount, the clamping shoulder 10 will engage the relatively non-contractible enlarged head portion 16 at surface 17b as shown in Fig. 5, and it is evident that further contraction of the weakened sleeve portion 22 will be prevented.

Figure 3:
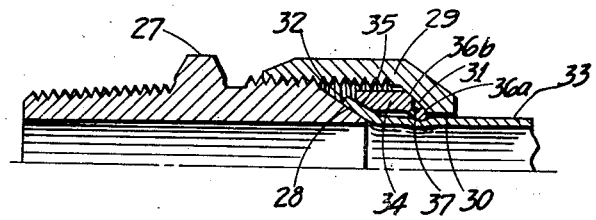
Fig. 3 is a longitudinal quarter sectional view of the invention as embodied in a coupling for flared tubes.

Figure 3 illustrates the invention as applied to couplings for flared tubes. In this embodiment, the body member 27 is provided with a male coniform seat 28 adapted to enter the flared end 32 of a tube 33, and has threaded connection with a nut 29 having a tapered clamping shoulder 31 and a bore 30 for receiving the tube. A sleeve 34 is disposed within the nut and has at its inward end a female coniform seat 35 adapted to engage the outer surface of the flared tube end 32 and at its outward end has a tapered thrust surface divided by a groove 37 into radially inner and outer sections 36a and 36b, respectively. When the nut 29 is threaded upon the body member 27, the sleeve is moved forward against the tube flare 32 to tightly clamp it against the body seat 28. The clamping shoulder 31 and the outward part of the sleeve are formed and function precisely the same as the clamping shoulder 10 and the outward part of sleeve 11 already described in connection with the coupling for unflared tubes.

One of the objects of this invention is to provide a vibration dampening coupling wherein the vibration dampening means may be effectively limited in extent without requiring the holding of close manufacturing tolerances. In the present structure the principal factors determining the amount of vibration-dampening grip obtained are the initial fit or clearance 25 (see Fig. 4) between the sleeve and tube, and the initial space 26 between the clamping surface 10 and the outer sleeve surface 17b. Any variations in the fit or clearance 25 depend upon the manufacturing tolerances held for the diameter of the tube and the diameter of the sleeve bore 38. The bore 38 can be easily held within a few thousandths variation on present day machine tools, and tubing is supplied commercially with but a few thousandths variation in outside diameter. The fit 25 may therefore be maintained within fairly close limits with little or no difficulty. Variations in the clearance 26 depend, for all practical purposes, only upon variations in the relative angles A and B since surfaces 17a and 17b are at the same angles and on the same line. If these surfaces would be offset or at different angles, then the amount of offset or the location of one angle with respect to the other become additional factors to control in order to maintain the clearance 26 uniform from one set of parts to another. Thus by keeping surfaces 17a and 17b in line and at the same angle, there are a minimum of dimensions which must be closely controlled to minimize the variations in the clearance 26, with the result that manufacture of the parts is correspondingly simplified.

When workmen attach couplings to tubes, they very often rely only upon "feel" to indicate when enough wrench pressure has been applied, with the result that considerable variation exists in the actual wrench torques employed. It is, therefore, desirable that the vibration dampening means be readily operable whereby it will be brought into full effect at the lowest wrench pressures apt to be used. The groove 18 weakens the extreme portion 22 of the sleeve head so that it will contract readily at low torque, and may be provided with negligible complication in the method or increase in the cost of manufacture. Being annular, it may be formed on the same machine set-up used for forming the remaining portion of the outside contour, and therefore does not add any appreciable expense to the manufacture of the part.

From the above it will be apparent that the improved coupling herein described provides readily operable means for obtaining a limited vibration dampening grip upon a tube, and wherein the coupling parts are relatively simple and economical to manufacture. It is also apparent that minor changes in the details of the construction and arrangement of the parts may be made without departing from the spirit of the invention as set forth in the following claims.

I claim:

1. A coupling for tubes comprising a body member to which a tube is to be attached, a nut having interconnection with said body member and having a frusto-conical clamping shoulder, a sleeve between said nut and body member and adapted at its inward end to engage a tube for holding it within said coupling, the outward end of said sleeve including a readily contractible portion and a relatively non-contractible portion having relatively greater cross-sectional area than said readily contractible portion, said sleeve including a third portion between said first two portions of less cross-sectional area than either of them to provide a weakened bending zone which permits said contractible portion to be readily contracted even though integral with said non-contractible portion, said frusto-conical clamping shoulder initially extending axially opposite both the contractible and non-contractible portions and being adapted to initially engage and contract said contractible portion a predetermined amount and subsequently to abruptly engage said non-contractible portion whereby further contraction of said contractible portion will be prevented.

2. In a coupling for tubes, a body member to which a tube is to be attached, retaining means interconnected with said body member and having a tapered clamping shoulder, a sleeve between said body and said retaining means and adapted to engage the tube for holding it in the coupling, said sleeve having an enlarged head with a tapered clamping face opposed to said clamping shoulder, said head having a contractible portion and a relatively non-contractible portion separated by a groove and each defined in part by said face, said groove being of major depth compared to the thickness of said head at the point wherein said groove is formed said clamping shoulder being adapted to initially engage and contract said contractible portion a predetermined amount and subsequently to abruptly engage said non-contractible portion whereby further contraction of said contractible portion is prevented.

3. In a coupling for tubes, a body member to which a tube is to be attached, retaining means interconnected with said body member and having a tapered clamping shoulder, a sleeve between said body and said retaining means and adapted to engage the tube for holding it in the coupling, said sleeve having an enlarged head with a tapered clamping face opposed to said shoulder, said head having a contractible portion and a relatively non-contractible portion each defined in part by said face, said shoulder being adapted to initially engage and contract said contractible portion a predetermined amount and to subsequently abruptly engage said non-contractible portion for positively preventing further contraction of said contractible portion.

4. In a coupling for tubes, a body member to which a tube is to be attached, a retaining member interconnected with said body member and having a tapered clamping face, a gripping member between said body and said retaining member and adapted to grip the tube for holding it within said coupling, means associated with said gripping member for obtaining a second grip upon said tube and including a contractible portion having relatively less cross sectional area and a relatively non-contractible portion having relatively greater cross sectional area, said means including a tapered clamping face adapted to be engaged by said first named clamping face, one of said clamping faces being formed with radially inner and outer sections separated by a groove, and means for initially bringing the inner section into contact with the opposed clamping face for contracting the contractible portion a predetermined amount and for subsequently bringing the outer section into abrupt contact with said opposed clamping face for positively preventing further contraction of said contractible portion.

5. As an article of manufacture, a sleeve for couplings comprising a hollow cylinder having means at one end for engaging a tube for holding the tube within a coupling, the other end of said sleeve being provided with the following portions arranged in succession; a thick non-contractible annular portion, a thin annular portion and a contractible annular portion of intermediate thickness, said thin annular portion being of minor thickness as compared to said contractible and non-contractible portions and constituting a bendable transition portion from said non-contractible portion to said contractible portion, and both said contractible and non-contractible portions being defined in part by aligned frusto-conical faces.

JOHN N. WOLFRAM.

REFERENCES CITED

The following references are of record in the file of this patent:

UNITED STATES PATENTS

| Number | Name | Date |
| --- | --- | --- |
| 1,755,210 | Dohner | Apr. 22, 1930 |
| 1,920,512 | Lamont | Aug. 1, 1933 |
| 2,182,811 | Kocher | Dec. 12, 1939 |
| 2,271,502 | Synder | Jan. 27, 1942 |